(12) United States Patent
Rubenzer et al.

(10) Patent No.: US 8,597,017 B2
(45) Date of Patent: Dec. 3, 2013

(54) LINEALLY ADJUSTABLE MOLDS, MOLDING METHODS, AND PRODUCTS THEREFROM

(75) Inventors: Troy Rubenzer, Hudson, WI (US); Jim Eggert, Woodbury, MN (US); Dale Thompson, West Saint Paul, MN (US); Kathleen Barton, Birchwood, MN (US); David J. Weiss, Stillwater, MN (US); Matt Sedivy, Osceola, MN (US)

(73) Assignee: Anderson Corporation, Bayport, MN (US)

( * ) Notice: Subject to any disclaimer, the term of this patent is extended or adjusted under 35 U.S.C. 154(b) by 363 days.

(21) Appl. No.: 12/971,135

(22) Filed: Dec. 17, 2010

(65) Prior Publication Data

US 2011/0171434 A1 Jul. 14, 2011

Related U.S. Application Data

(60) Provisional application No. 61/287,869, filed on Dec. 18, 2009.

(51) Int. Cl.
*B29C 33/42* (2006.01)

(52) U.S. Cl.
USPC ........... 425/543; 425/183; 425/193; 425/190; 425/63; 425/544; 425/577; 249/99; 249/102; 249/155; 249/156; 249/160; 249/161

(58) Field of Classification Search
USPC ......... 425/183, 193, 394, 461, 464, 465, 190, 425/191, 192 R, 589, 63, 87, 177, 543, 544, 425/554, 577; 249/99, 102, 155, 156, 160, 249/161, 163
See application file for complete search history.

(56) References Cited

U.S. PATENT DOCUMENTS

| | | | | |
|---|---|---|---|---|
| 4,087,072 | A * | 5/1978 | Olsen | 249/129 |
| 6,572,355 | B1 * | 6/2003 | Bauman et al. | 425/112 |
| 7,001,163 | B2 * | 2/2006 | McBride et al. | 425/28.1 |
| 2003/0034576 | A1 * | 2/2003 | Russell | 264/33 |
| 2005/0025854 | A1 * | 2/2005 | Ness | 425/441 |
| 2005/0211871 | A1 * | 9/2005 | Ness et al. | 249/140 |

* cited by examiner

*Primary Examiner* — Joseph S Del Sole
*Assistant Examiner* — Lawrence D Hohenbrink, Jr.
(74) *Attorney, Agent, or Firm* — Womble Carlyle Sandridge & Rice, LLP

(57) ABSTRACT

A mold for producing a variety of fenestration members having different predetermined lengths is disclosed. Generally, the mold has a first lineal mold part that has an extended length and a second lineal mold part also having an extended length. The mold may also have mold end parts that are adapted to form end features of the fenestration member. In use, the first lineal mold part and the second lineal mold part fit together to define a profile. The first and second mold end parts can be positioned in a range of positions to define the lengths of a variety of different molded fenestration members.

14 Claims, 7 Drawing Sheets

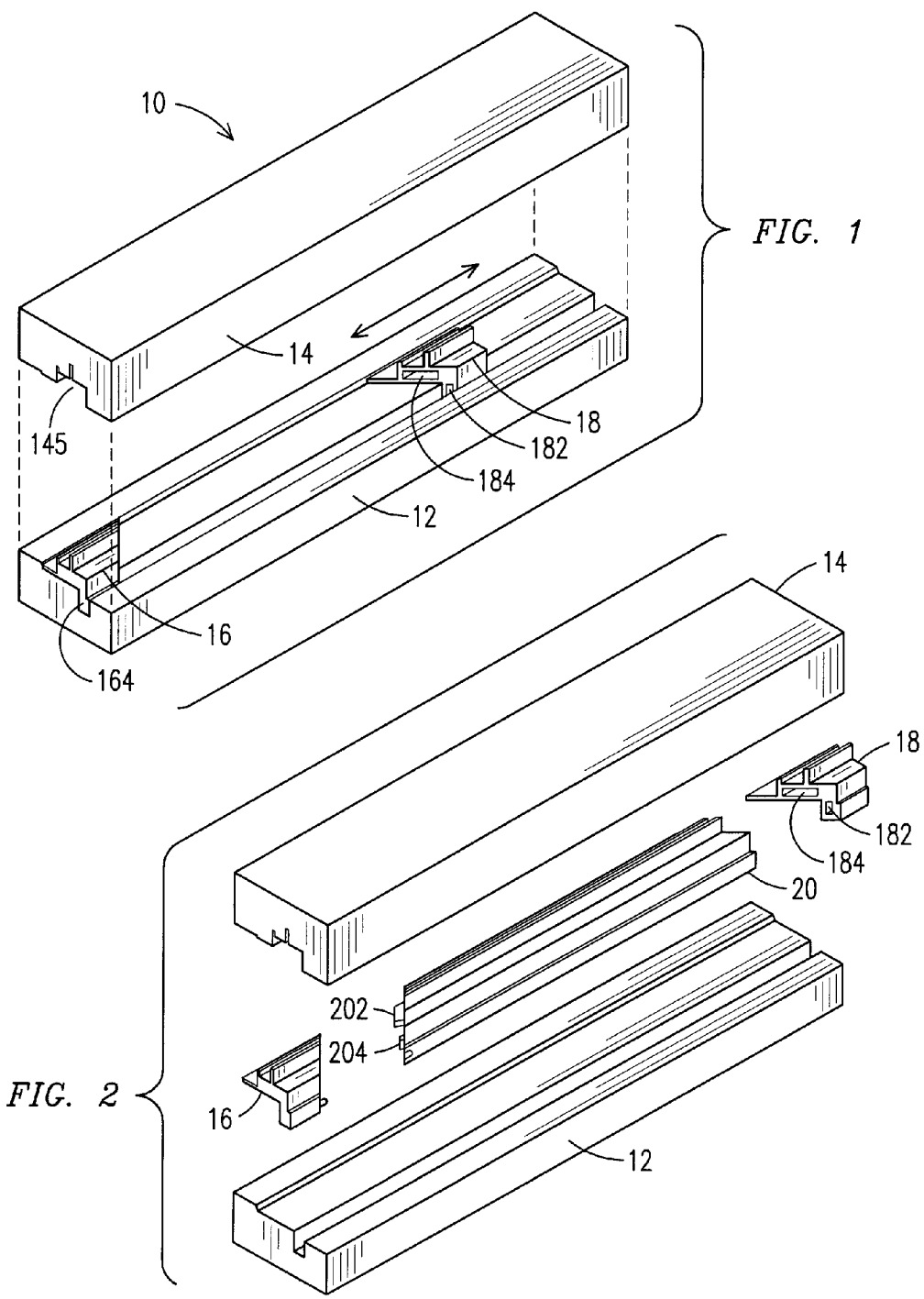

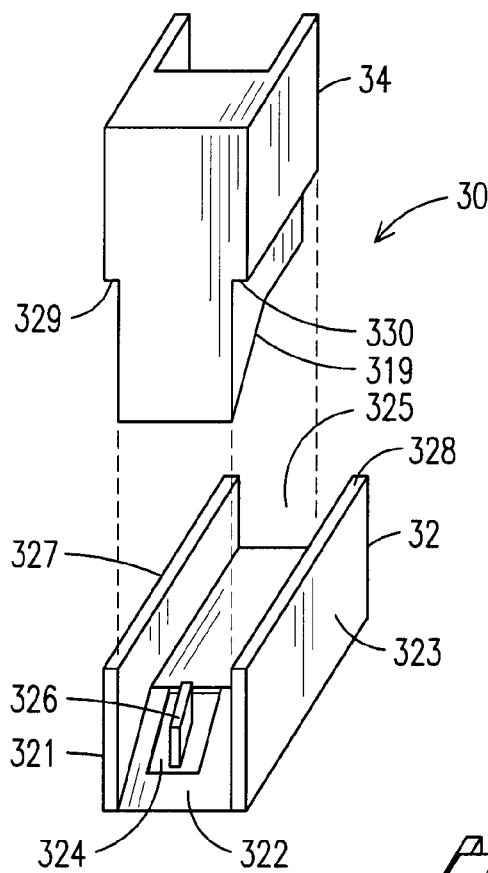
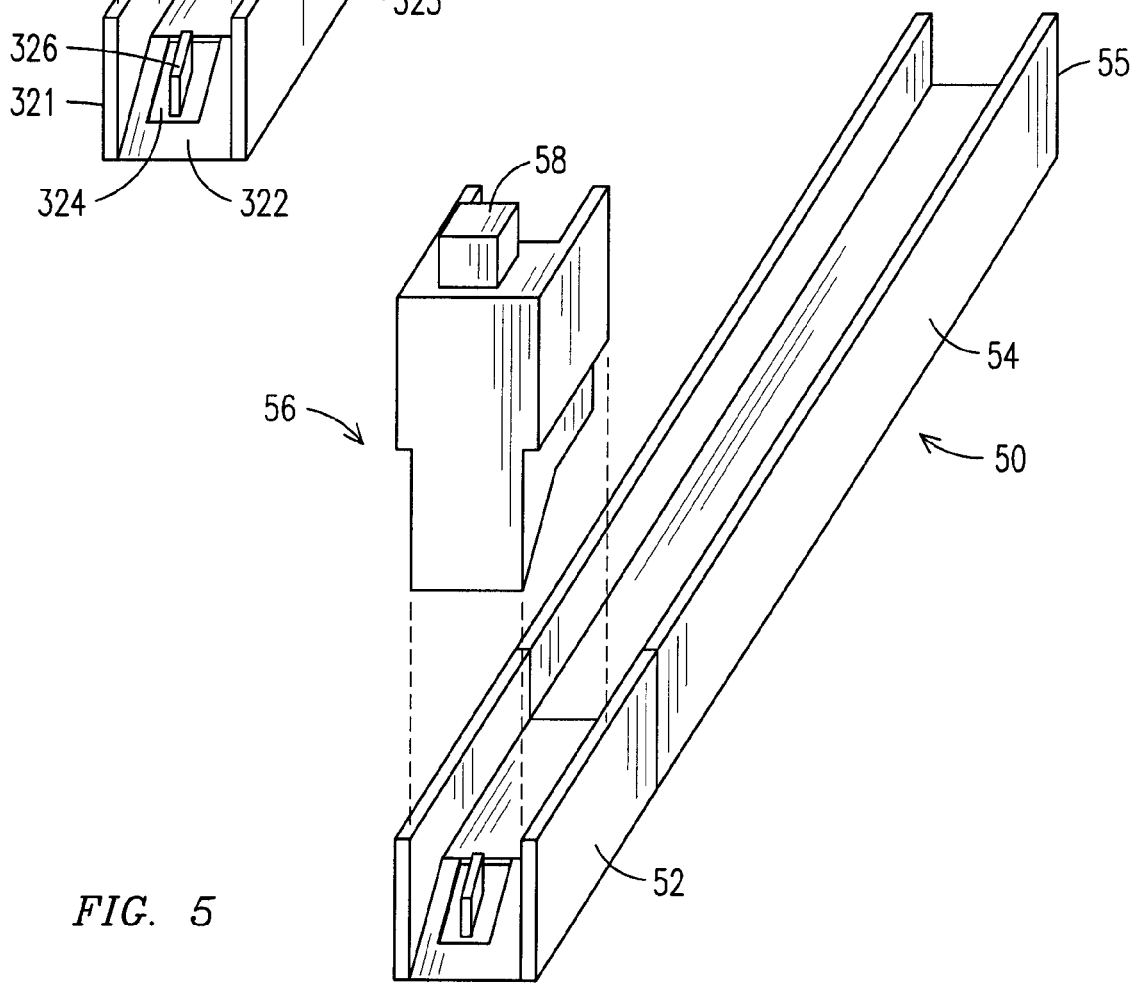
FIG. 3
FIG. 5

LINEALLY ADJUSTABLE MOLDS, MOLDING METHODS, AND PRODUCTS THEREFROM

CROSS REFERENCE TO RELATED APPLICATION

This application claims the benefit of U.S. Provisional Patent Application No. 61/287,869, filed Dec. 18, 2009.

TECHNICAL FIELD

This disclosure relates generally to molds for producing lineal fenestration members having different predetermined lengths.

BACKGROUND

A longstanding concern in the window industry is that water may accumulate in the lower part of the window and leak into the house or other structure. Of particular concern is the potential for water to leak into the rough opening and into the wall of the structure, where it could go undetected and decay could occur. While sealing of the joints between the various parts of the window has proven beneficial, failures can still occur, due, for example, to shifting of the building structure that may deform the window and open sealed joints, and potential deterioration of the sealant material itself. A more reliable approach would be to eliminate or improve the joints between members where water could accumulate and leaks could occur. It is to the provision of a mold and molding method that addresses the above and additional needs that this disclosure is directed.

SUMMARY

The entire contents of U.S. provisional patent application 61/287,869, to which priority is claimed above, is hereby incorporated by reference.

A lineally adjustable mold is disclosed for molding lineal members, such as those used in fenestration units and other structures, having various lengths in a reaction injection molding (RIM) process. The mold comprises at least one lineal part having an extended length and at least one end piece that can be located at a continuous range of selected positions along the lineal part to produce lineal members in a range of different lengths. In one embodiment, the end pieces of the mold are adapted for molding end configurations for the lineals that enable two or more lineals to be fitted together in an end-to-end manner to form an assembly for a fenestration unit. In other embodiments, such as cornices, the end pieces of the mold form a decorative configuration at least at one end of the member. The end pieces of the mold can be removable mold parts that are removed from the molded part after curing of the RIM material, or, in alternative embodiments, the end pieces can be preformed fenestration components that become part of the molded member after curing of the molding material. The preformed end parts can include resilient material on selected surfaces that act as gaskets for sealing joints between members.

Moveable end parts can be manually positioned and held in place by suitable holding devices, or can be positioned by powered mechanisms. Powered positioning mechanisms can be manually controlled or can be controlled by a programmable controller having, for example, a user interface that allows the operator to enter final product specifications to obtain a molded product of a desired length, thereby creating a programmable mold.

As used herein, the term lineal member will refer in one instance to a member that extends along an axis and that has a constant cross sectional profile in planes perpendicular to the axis along a substantial portion of that axis. Members that are otherwise lineal but that have end portions not constant along the axis, as might be needed for coupling with other members, for example, will still be referred to as lineal members or substantially lineal members. The axis of a lineal member may be a straight line, a curved line, or a segmented line. Segmented lines are combinations of straight lines that meet at non-zero angles, or combinations of straight lines and curved lines. As used herein, the term extended length will refer to a length greater than the length of the longest member that a lineally adjustable mold is expected to produce. More generally, a lineal member may refer to any part of a window or door unit other than the glass, including, for instance, frames, sashes, sills, grilles, headers, molding, trim, and the like.

Members may also be lineal in more than one direction. For example, the bevel edged panels that fill the openings between the stiles and rails of many doors have a substantially constant cross section in both the horizontal and vertical directions.

Also disclosed are joint structures for joining fenestration members that take particular advantage of the ability of RIM to repeatedly reproduce complex structures having a high level of precision. Such joint structures may include mitered portions combined with mortise and tenon portions in a manner that enhances joint strength, joint appearance and joint sealing. It will be appreciated that simple mortise and tenon joints and simple miter joints also can be molded. Similarly, other types of joints, such as butt joints and saddle joints, both well known in the joinery art, also may be produced.

Precisely fitted joints of the type disclosed herein are particularly well adapted to structures that can be sold in disassembled, or knocked down, form, and assembled by a purchaser at the point of use. Such items include bookcases, storage shelves, product display structures, and other structures that might be used in the home, business, or elsewhere. The precision with which the joints can be molded and the ability to produce joints of greater complexity in order to achieve greater strength and rigidity can be very advantageous for such products. In addition, the ability to produce a variety of sizes and configurations by the use of adjustable molds is also a great advantage for cost effective production of whole product lines of such items in the form of modular systems. Additionally, the precision and robustness of the joints may be advantageous in situations wherein a structure needs to be assembled, disassembled, and reassembled multiple times.

It will also be recognized that decorative members such as cornices for trimming above windows and doors are often needed in a variety of lengths, but with the same cross-sectional profile. Lineally adjustable molds are therefore well suited for this application. Similarly, door thresholds and window sills are often needed in different lengths, for different widths of doors and windows, so that the lineally adjustable molds are useful for this application as well.

The invention will be better appreciated and understood upon review of the detailed description presented below in conjunction with the accompanying drawing figures, which are briefly described as follows.

BRIEF DESCRIPTION OF THE DRAWINGS

FIG. 1 is an exploded perspective view of a mold system for molding lineal members according aspects of the invention.

FIG. 2 is another exploded perspective view of the mold system of FIG. 1 showing a lineal member produced with the mold.

FIG. 3 is an exploded perspective view of the ends of a pair of lineal members formed according to the invention.

FIG. 4 is a perspective view of the ends shown in FIG. 3 joined together to form a strong load bearing joint.

FIG. 5 is an exploded perspective view illustrating formation of a lineal by injection molding a lineal member onto a pre-formed end part according to the disclosure.

DETAILED DESCRIPTION

Figure 6:
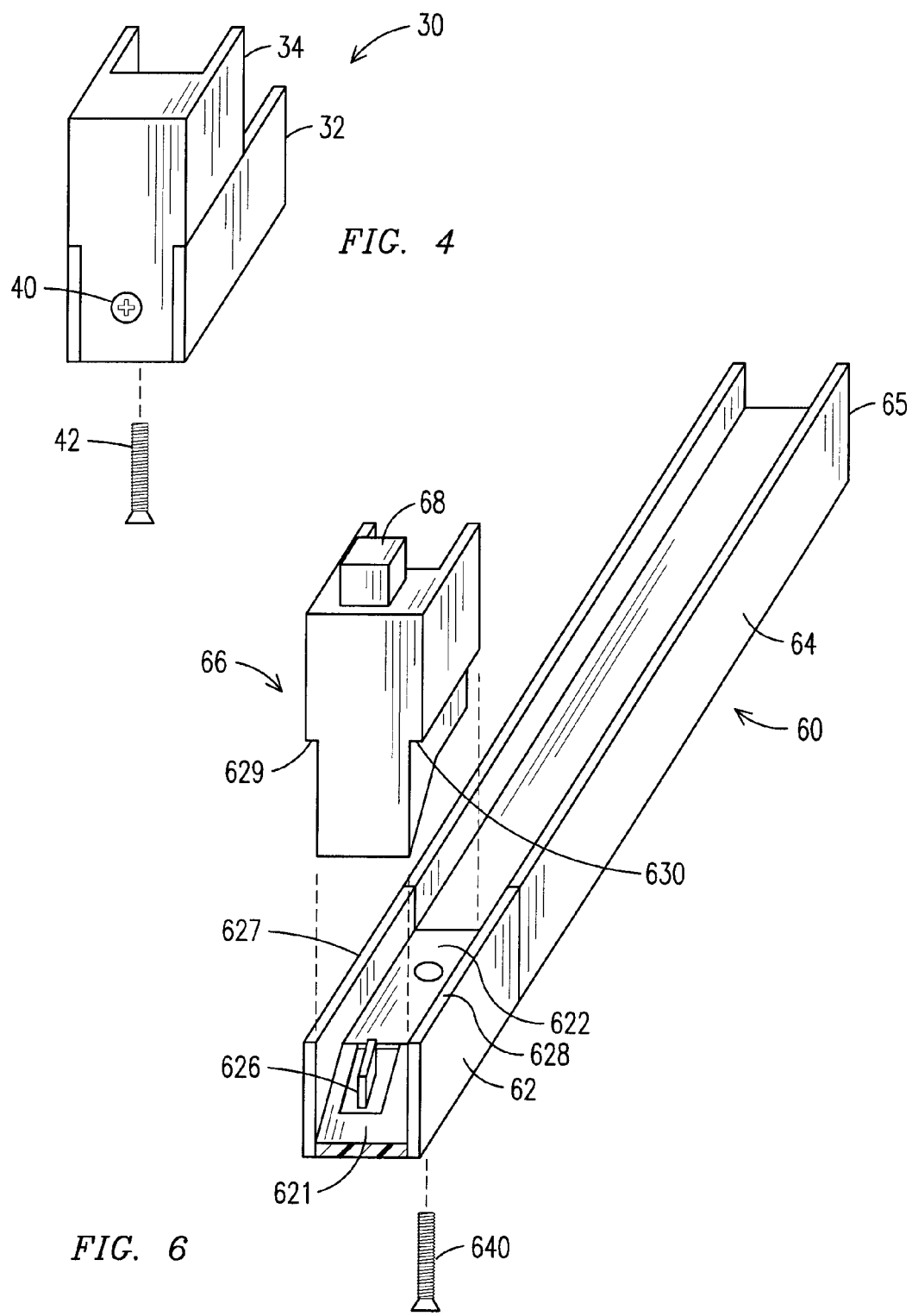
FIG. 6 is an exploded perspective view of the ends components of a pair of lineal members illustrating molding of resilient sealing surfaces as a part of the RIM molding methods of this disclosure.

The mold portrayed in FIGS. 1 and 2 functions as a lineally adjustable mold according to aspects of the present invention. Mold 10 comprises first extended length lineal profile part 12, second extended length lineal profile part 14, first end mold part 16, and second end mold part 18, which fit together to define an internal mold cavity for molding lineal member 20 of a fenestration unit, shown in FIG. 2. The types of end features that can be molded into the member are not particularly limited, and alternative end features, such as those that serve a structural, connecting, or purely decorative function, may be produced, merely by substituting different end parts 16 and 18.

It will be appreciated that while lineal profile mold parts 12 and 14 are each shown as single parts, they may also be made up of two or more components bolted or otherwise fastened together to form a modular mold system. In alternative embodiments, parts 12 and 14 may be made up of two or more components placed end to end, optionally having different cross sectional profiles, so as to produce a lineal member having a first cross sectional profile along a first longitudinal portion and a second profile along a second longitudinal portion, and, in still other embodiments, other cross sectional profiles along other longitudinal portions. In still other embodiments, lineal mold parts 12 and 14 may be made up of lineal components placed side by side and bolted or otherwise fastened together. By providing a variety of different lineal components, which can be assembled in different combinations, a greater variety of cross sectional profiles can be created with fewer mold parts.

Molds can be made from a variety of materials, depending upon the type of member being molded, and it is possible to use different materials for different mold parts. Referring to FIG. 1, lineal mold parts 12 and 14 can be made of aluminum or other metal, to achieve durability and dimensional stability, particularly if it is important to maintain a high level of straightness over an extended length. If curved lineal members are to be produced, elastomeric or other flexible materials may be used to make lineal mold parts that can be bent into curves prior to use. It may be useful to provide fixturing to hold the bent lineal mold parts in specified curved shapes. End parts 16 and 18 can also be made of a metal, such as aluminum, although other materials may also be used. In particular, since the temperatures produced by reaction of the molding materials during cure is well below the melting point of many thermoplastic materials, polymeric materials can be used as end parts. Materials that are particularly useful are those with low surface energy, such as high density polyethylene (HDPE), polyacetals (DELRIN®) and fluoropolymers (TEFLON®), in that they reduce the need for a liquid mold release to allow them to be removed from the molded member after curing. This reduces the risk of poor adhesion of paint and adhesives due to residual mold release remaining on the molded member after removal from the mold.

In building a mold, methods of fabricating the parts making up the mold can be chosen according to the materials being used. Metal parts, such as straight lineal parts 12 and 14, can be made by machining from aluminum or other metal bar stock. If larger quantities of a particular mold part are needed, it may be convenient to extrude a suitable material and cut it to length. Flexible lineal mold parts can be made by molding or extruding rubber or other flexible or elastomeric material. If a member having the desired shape already exists, and the task is to duplicate it, the original member may be used as a pattern to cast an impression, which can then be used as a mold for molding additional mold parts. End parts for a lineal mold can be made by machining or molding, as well. It has also been found that some wax materials having a melting point suitably high to withstand RIM molding temperatures can be used as materials for mold parts.

Referring to FIG. 1, a method for using mold 10 to mold lineal members is first to install end parts 16 and 18 onto first lineal mold part 12 at predetermined positions, as determined by the desired length of the lineal member being molded. The mold is then closed by clamping lineal mold part 14 over end portions 16 and 18 and lineal mold part 12, thereby forming an internal mold cavity. The length of the lineal member to be molded is typically determined by the position of end part 18, with end part 16 being fixed for all lengths produced. This need not be the case, however, as both end parts can be moved to suitable positions along lineal mold part 12 to define a predetermined length therebetween. In other embodiments, for example, when the mold is segmented, the lengths of both segments may need to be adjusted relative to the corner where the two segments join. Similarly, when the mold combines a straight portion and a curved portion, the relative lengths of the two portions can be adjusted by moving both end parts to appropriate positions. End parts 16 and 18 can be held in place by suitable stops or other holding devices. The holding devices may be manually operated or power operated. Power operated holding devices may be further operated by programmable controllers. Clamping of lineal parts 12 and 14 can be achieved by hydraulic, mechanical, or other suitable clamps. Heavy duty bar clamps of the type used in woodworking have been found useful.

Figure 15:
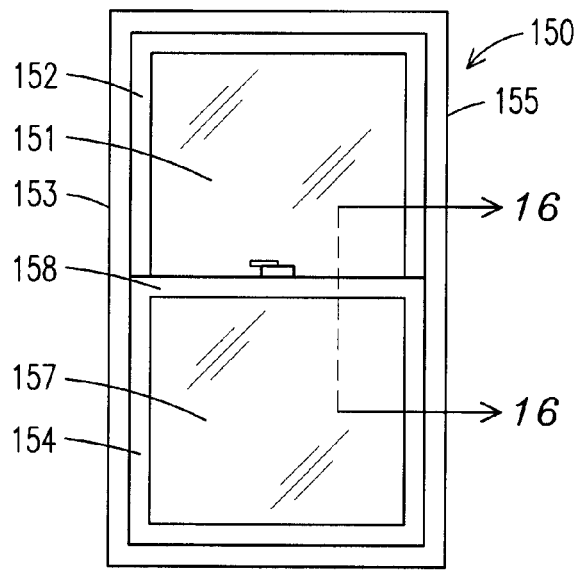
FIGS. 15-16 illustrate a conventional double hung window with transition stops between the upper sash and the lower sash.

Lineally adjustable molds may incorporate features that provide useful departures from strict lineality at selected intermediate points along a lineal member. For example, features can be molded into vertical members of double hung window frames that avoid the need to attach separate parts that complicate assembly and risk producing leaks. FIG. 15 illustrates conventional double hung window 150 having upper sash 152 and lower sash 154. The sashes are held in a frame having vertical side members, or jambs, 153 and 155, in which the sashes can slide vertically for opening and closing. Sashes 152 and 155 hold glazing units 151 and 157, which can be single sheets of glass, but preferably are double pane insulated glazing units, which are well known and commercially available from a variety of sources. In opening window 150, sash 152 can slide downward, and sash 154 can slide upward. Since both sashes are moveable, sealing between them has proven to be challenging.

Figure 16:
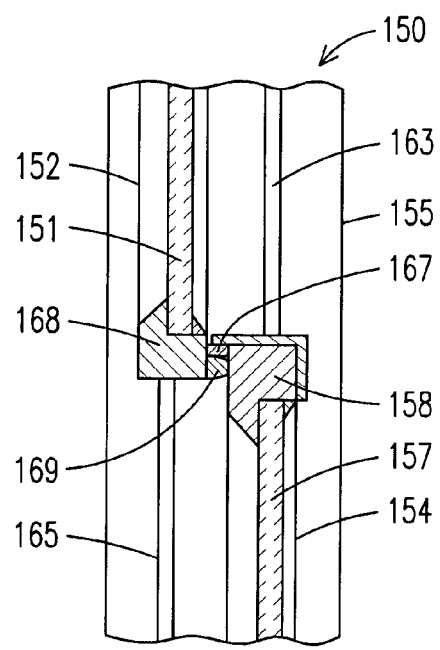

Referring to FIG. 16, one way of sealing the gap between sashes 152 and 154 is to provide flexible sealing member 169, which is fixedly attached to lower rail 168 of sash 152. Sealing member 169 may be a resilient fin or tubular component, or other known material of the type that may be effective in providing a sealing function. When the sashes 152 and 154 are in the closed position, sealing member 169 deforms to seal against upper rail 158 of sash 154. While sealing member 169 is effective in sealing between rails 158 and 168, it has been found less effective in sealing gaps beyond the sides of the sashes, adjacent to vertical members 153 and 155, in the areas of rails 158 and 168. This problem has been remedied by providing transition stops 167, attached to vertical members 153 and 155, and which extend inwardly from vertical members 153 and 155, and are positioned to enable the ends of sealing member 169 to press upward against them, thereby providing a seal. Transition stops 167 can be provided as, for example, resilient foam components attached to vertical members 153 and 155. Attaching stops 167 to vertical members 153 and 155 can be made difficult, however, by the need for locating them precisely and attaching them without drilling holes that might require additional sealing or the risk of leakage. Lineally adjustable molds can be adapted, however, to provide integrally molded-in transition stops. Integrally molded-in transition stops can be used alone to provide a surface against which sealing member 169 seals, or may provide a fastening function for another component, such as a foam seal, to be attached thereto.

Figure 17:
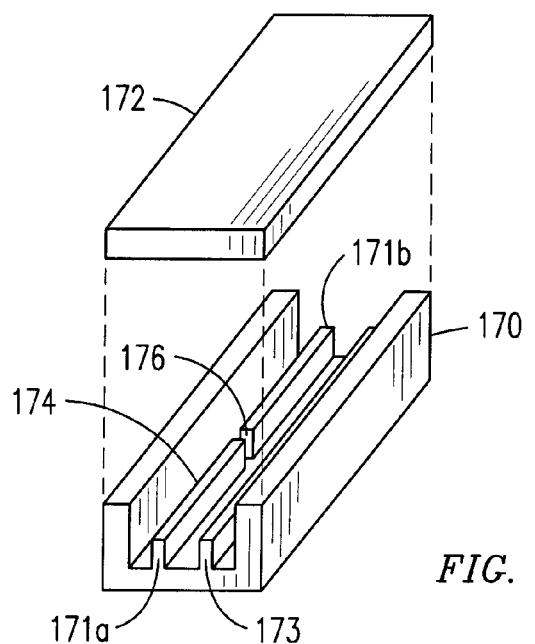
FIG. 17 illustrates a lineally adjustable mold for molding in an intermediate stop in a molded-in channel.

Referring to FIG. 17, lineal profile mold part 170, not shown in full length, for molding a member containing longitudinal channels, is shown. Ribs 171a, 171b, and 173 extend into mold cavity 174 to provide molded-in channels in the molded member. If it is desired to provide a molded-in stop in one of the channels, gap 176 can be provided. The location of gap 176 can be adjusted by locating the end pieces, not shown, of the mold, at the desired distance from gap 176. In an alternative embodiment, ribs 171a and 171b can be separate parts, slidable along lineal profile part 170, to enable the size and location of gap 176 to be adjusted. This general mold design can be used to provide stops such as stop 169, when used in a suitable mold, as well as other integrally molded intermediate features in lineal members.

Other intermediate features also may be provided by adding inserts at intermediate locations in lineal profile mold parts. Such inserts may be removable, in a manner similar to removable end pieces, after curing of the molding material, or may become part of the molded member itself. Permanently molded-in inserts may be of a standard type of the sort commonly found in molded RIM parts, or may be special purpose inserts produced for particular applications.

The molding process is performed by injecting molding material into the internal cavity of the closed mold through an injection port (not shown). The injection port may be located proximate one end of the mold, though other locations may be useful in particular applications. One method of injecting the molding material is to tilt the mold so that one end is higher than the other, and inject the molding material at the lower end to fill the internal cavity progressively, thereby reducing the likelihood of trapped air causing defects in the resulting lineal member.

Venting to allow air removal from the mold during injection can be provided in a manner conventional to known RIM processes. For example, a small hole can be placed in an inconspicuous location at the top end of the mold.

Useful molding materials are those sometimes used in reaction injection molding (RIM) processes that comprise a blend of reactive monomeric fluid components that can be mixed just prior to injections, injected into the mold, and allowed to react within the mold to form a solid polymeric lineal member. Useful RIM components may include a first component comprising isocyanate chemical groups, and a second component, such as a polyol, comprising hydroxyl groups, which react to form a polyurethane polymer. Additionally, foaming agents have been found useful, to produce a lineal member that is lighter in weight, with lower thermal conductivity, and an improved ability to accept and retain fasteners such as screws. One suitable reactive system for use as a molding material is Baydur 665, from Bayer Material Science. Other reaction injection polymer or non-polymer materials also may be selected depending upon application specific requirements. Baydur 665 has been found to have a suitable reaction time and has the additional advantage that the cured product is a structural foam.

The reactive molding material may also include particulate fillers of the type typically used in RIM applications to improve the mechanical and other properties of the cured product and to reduce material cost. Such fillers include talc, calcium carbonate, fly ash, Wollastonite, and other inorganic materials. In some embodiments, organic fillers such as rice hulls, for example, may be used. A particularly useful filler has been found to be NYGLOS 8 Wollastonite, available from Nyco of Willsboro, N.Y., which is added to the Baydur 665 system in an amount of approximately 5% to 40% and more preferably about 20% of the overall composition. While it was thought that higher loadings of Wollastonite might further improve the mechanical properties of the cured product, it also was found that higher loadings increased the viscosity of the molding material prior to cure to such an extent that processing became difficult. It will be appreciated that this limitation is specific to Wollastonite and to Baydur 665, and that this specific limitation may not apply to other fillers and reactive molding material systems. Because fillers typically contain moisture, it was found useful to add the filler to the polyol part of the Baydur 665 rather than to the isocyanate part, prior to mixing of the isocyanate and polyol, since isocyanate reacts strongly with water, and such a reaction could interfere with the desired reaction between the isocyanate and the polyol.

As is well known in the art, the adhesive nature of some reaction injection molding materials can create a tendency for molded parts to adhere to the molds, thereby complicating de-molding. A variety of mold release agents are commercially available, with the choice depending on a variety of factors, in particular, whether the molded part is to be painted after removal from the mold. A mold release that was found useful was Chem-Trend Pura 11166, available from Chem-Trend, 1445 West McPherson Park Drive, P.O. Box 860, Howell, Mich., 48844-0860. Pura 11166 was effective in releasing parts from the mold, did not cause damage to the mold or excessive buildup of residual material in the mold after repeated moldings, did not cause inconvenient extension of the molding cycle, and allowed the molded parts to be painted after molding. As would be recognized by one skilled in the art, other molding situations might call for different mold release agents. For example, in-mold painting, a well recognized operation in the RIM industry, may call for a different mold release, one perhaps formulated specifically for that purpose.

Various types of injection systems or injection guns for injecting the molding material into the mold are commercially available. For example, RIM injection systems available from High Tech Engineering of Grand Rapids, Mich. have been found to perform well the metering and mixing functions, as well as the injection function. It may be desirable that the reactive components of the molding material be metered and mixed in the proper quantities for a desired lineal member just before injection into the internal cavity of the mold. As is conventional practice in RIM, it is useful to run the mixed injection material through an aftermixer, or peanut mixer, just prior to injection into the mold, to reduce any turbulence caused by the first mixing process and provide a more laminar flow into the mold. Alternatively, the components may be mixed prior to injection into the mold with the injection gun. The volume of molding material to be injected depends, of course, on the volume of the internal cavity of the mold, and account should be taken of the possible expansion of the reactive components of the molding material as it cures within the mold.

It is useful to provide flow channels in the mold to circulate a temperature controlling fluid such as oil, water, or a water and ethylene glycol blend, or other like fluid, through the body of the mold. In addition, it is further useful to provide one or more thermocouples or other temperature sensing devices in the body of the mold for sensing the mold temperature and providing feedback to the fluid heating and cooling system for maintaining the mold temperature within predetermined limits during the molding process. In the present case, wherein Baydur 665 is the molding material, and a water ethylene glycol blend is the fluid, the mold is first heated, at the beginning of injection, to a temperature that allows the injected material to form a solid skin at the mold surface, while providing a foamed structure in the bulk of the molded part. Since the reaction of the molding material is exothermic, the fluid temperature is then lowered, in response to the rising mold temperature, as indicated by the temperature sensor, to maintain the mold temperature in a range that produces a satisfactory foam structure and surface quality.

Bayer recommends a mold temperature of 140° F. to 160° F. (60° C. to 70° C.) for Baydur 665. A temperature of 130° F. (54° C.) was found, in one of the molds used in the present invention, to produce satisfactory results. Since in this particular case, the temperature sensor was a slight distance away from the surface contacting the molding material, it was estimated that the actual mold surface temperature was slightly higher, due to the heat generated by the reaction of the molding material, and was therefore near to the range recommended by Bayer. It was found that allowing the measured mold temperature to fall far below 130° F. produced a deterioration in the surface quality of the molded part, while allowing the measured mold temperature to rise far above 130° F. produced a non-uniform internal foam structure in the part. It will be appreciated that while the mold temperature control system described herein was found to produce satisfactory results, other mold temperature control systems, particularly those conventional to the RIM industry, may produce equally satisfactory results, and are also considered enabling to the present invention.

Once the mold has been closed and clamped, and the molding material injected, the mold is held clamped until the curing reaction has produced at least partial and perhaps complete solidification. The mold is then opened by separating the lineal mold parts, and the molded lineal member, possibly with the end mold parts still attached, is removed. Depending on the design of the molded member, the end parts may then be removed from the molded member by, for example, pulling them from the ends of the molded lineal member to leave ends shaped by the shape of the end parts. Other conventional de-molding techniques, such as providing knockout pins and injecting compressed air, may also be used. It will be understood that the exact sequence, direction, and method of opening the mold and removing the molded member from the mold will depend upon the specific shape of the molded member and the configuration of the end parts of the mold. After removal from the mold, the molded lineal member may be trimmed or cleaned as necessary to remove any flash or other imperfections prior to use, in a manner conventional to other RIM processes.

The present method of producing lineal members for fenestration units is particularly useful in producing lineal members for fenestration units that are to be joined to other lineal members because complex joint configurations can be consistently reproduced to an exceptionally high level of precision. For instance, referring to FIG. 3, a complex joint between two lineal members having only two parts, namely the lineal members themselves, is illustrated. In FIG. 3, lineal members 32 and 34, (only the end portions of which are shown) may, for example, be a rail and stile for a window sash, with the window glass unit fitting into channel 325. It will be understood that the sash formed by members 32 and 34 is simplified, for the sake of clarity, and that the cross sectional profiles of alternative window sashes can be significantly more complex, without complicating the molding process and without departing from the scope of the invention.

The joint between lineal members 32 and 34 is a compound joint, in that it combines features of mitered joints with those of mortise and tenon joints. Mitered surface 322 of member 32 mate with a similar mitered surface 319 of member 34. Tenon 326 of member 32 fits into a mating mortise, not visible, in the end of member 34. Surface 330 of member 34 fits against edge 328 of wall 323, thereby forming a joint having the external appearance of a mortise and tenon joint. Similarly, surface 329 of member 34 fits against edge 327 of wall 321, thereby forming a joint having the external appearance of a mortise and tenon joint. Because the joint between members 32 and 34 involves multiple surfaces that engage at different angles, thereby supporting loads in a variety of directions, and because molding of the joint enables a high level of precision to be consistently achieved, members 32 and 34 fit tightly together, in a rigid manner. Referring to FIG. 4, the final fastening can be provided, for example, by a single screw 40, or by screw 42, or both, positioned as shown or otherwise positioned. The primary function of screws 40 and 42 is to hold the lineal members 32 and 34 in the engaged position, so as to enable the various closely engaged and precisely fitting joint interfaces to perform the primary load bearing functions of a window sash. In alternative embodiments, fasteners other than screws, for example eccentric cam type fasteners, or snap fit fasteners may be used, if found to be suitable. In some embodiments, an adhesive may be used as a fastener. Moreover, the specific positioning of the fasteners is not particularly limited, because the resulting lineal members are solid rather than hollow without screw bosses with which the screws must be aligned. This has been found to produce a particularly strong load bearing joint. It is further contemplated that adhesive bonding may be useful in some instances.

In the joining of lineal members of fenestration units, it often is required that joints between members not only provide a required level of structural strength and rigidity, but that they also seal against penetration of air and water. Because of the high structural strength and rigidity of the joint illustrated in FIG. 3, structural adhesive bonding at the joint is not required. Therefore, any sealants used for leak prevention need only serve the sealing function, and are not required to provide structural strength, although the sealants may aid in holding the joined members in their positions for optimum mechanical engagement. This simplifies the choice of sealants, in that compromises between structural strength and sealing ability become less critical. Additionally, the performance of sealants can be improved by providing them in layers of precisely controlled thicknesses. The ability of RIM to create joints having precisely controlled interfacial spacing in selected areas, by molding in precisely dimensioned spacers, is therefore useful in providing improved sealing of joints. Sealants can be applied to members prior to assembly, or injected through appropriately placed injection ports after assembly. In FIG. 3, recessed area 324 is provided to receive excess sealant that may have been applied, either by pre-application or by injection, so as to avoid forcing it out through visible portions of the joint. Alternative configurations for recessed area 324 or other excess sealant reservoirs may also be used, depending on the specific manner in which sealant is applied or injected and the particular areas that need to be sealed.

Referring to FIG. 5, lineal 50 is produced by molding lineal member 54 onto preformed end part 52 according to the disclosure. In this embodiment, end part 52 is placed in a first location of one mold part, clamped in place along with the remaining parts of the mold, and the resulting mold cavity, within which the end part 52 is located, is filled with molding material. Upon curing and removal from the mold, end part 52 becomes an integral part of lineal 50. It will be understood that while end 55 of member 50 is portrayed as a simple flat end, for simplicity, it too can have an end part similar to end part 52. A second lineal can be made by molding a lineal member onto end part 56. Optionally, it may be useful to provide end parts with protrusions or other features such as protrusion 58 to enhance the coupling between the molding material and the end part. End parts 52 and 56 can be produced by any suitable means, such as injection molding. Reaction injection molding of parts 52 and 56 may be most convenient, in order to achieve material compatibility between the end parts and the molded portions. Also, since the end parts are the same for many member configurations, the same end part tooling can be used for many member configurations.

In the embodiment illustrated in FIG. 6, an additional feature has been incorporated into an end part 62. Portions 621 and 622 are covered with a layer of resilient material that acts as a gasket for sealing the joint between end parts 62 and 66 tightly against water and air penetration. A fastener such as screw 640 can be used to pull end part 66 into secure engagement with end part 62. The thickness and mechanical properties of layers 621 and 622 are chosen to enable sealing contact to be made with part 66, while allowing surfaces 629 and 630 to engage with edges 627 and 628, respectively, to form a rigid structural joint. End part 62 can be produced by overmolding a resilient material onto part 62. When part 62 is produced by RIM, layers 621 and 622 can be provided as a single insert in the mold, prior to injection of the RIM resin material. While the mating and sealing surfaces are illustrated in FIG. 6 in simplified form for clarity, it will be understood that these surfaces may be significantly more complex in shape and profile. Further, the placement and configuration of the layer of resilient sealing material will be designed to function with the particular profile to seal leakage paths that might exist to prevent water penetration. Even so, the resilient sealing material still can be an insert placed in the mold before the RIM of the lineal member onto which the sealing surfaces are to be formed.

It will be recognized that molded-in inserts, of the type traditionally used in conventional RIM, can also be used in the present work. For example, referring again to FIG. 6, a threaded insert made of metal or other material could be molded into member 66 to receive screw 640. Similarly, hole 631 could be provided by a molded-in insert made of metal or other material. Other commonly used inserts include stiffening members and hollow or foam members for reducing material costs.

It has been found that the uncured or partially cured RIM molding materials in the Baydur 665 resin system exhibit a strong affinity for surfaces formed by previously cured RIM molding materials of the same or similar composition. This affinity is manifested in strong adhesion between the surfaces of a previously molded and cured RIM components and uncured RIM resin that comes in contact with the previously cured surfaces before curing. This affinity can be utilized to build up larger members by molding new portions onto previously molded and cured members.

Figure 8:
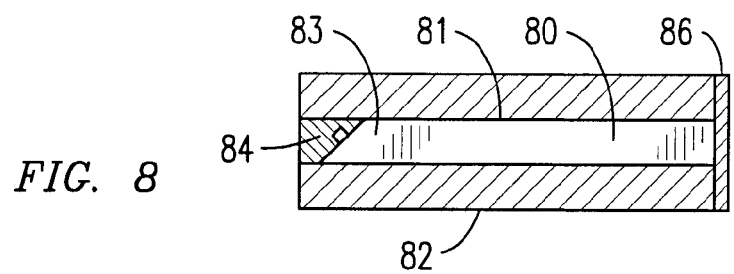
FIGS. 8-10 illustrate another molding technique according to the present disclosure for use in forming a unitary lineal member of virtually any desired length using the same mold and a two step molding methodology.

Referring to FIG. 8, which depicts one technique according to the disclosure, first RIM molded component 80 is produced by molding in a mold having lineal mold part 82 and end parts 84 and 86. It will be understood that lineal mold part 82 may actually be made up of two lineal mold parts or clamshell halves that can be separated for removal of molded component 80, as disclosed above. It will further be understood that end part 84 may be removed from the mold with member 80 and then removed from component 80 as a second mold removal step.

Figure 9:
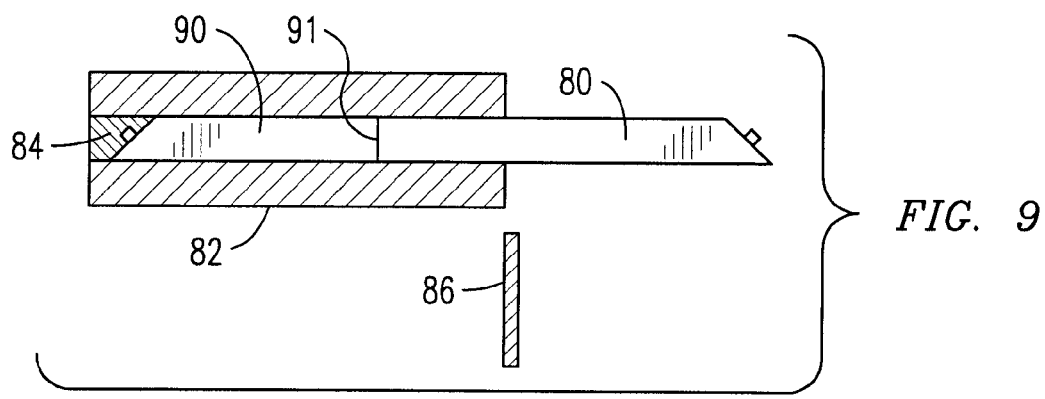
Figure 10:
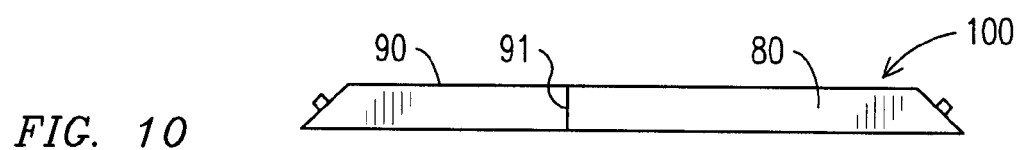

Referring to FIG. 9, once component member 80 is molded and removed from the mold, end part 86 can be removed from lineal mold part 82 and the molded member 80 can be inserted into the internal cavity of the mold to a predetermined location (at 91 in FIG. 9), determined by the desired length of the final molded part. The location 91 is virtually infinitely variable along the length of the mold cavity so that a completed lineal member of virtually any desired length can be molded. A second portion 90 of the lineal member is then formed within the unfilled portion of the internal cavity by a second injection of reactive molding material. Because of the affinity of the uncured reactive molding material for cured resin surfaces of the pre-molded lineal member 80, a unitary integrally formed lineal member, shown in FIG. 10, having a precisely predetermined length is produced using only a single fixed mold. While the joint between the first portion and the second portion of member 100 is shown, for illustrative purposes, as line 91 in FIG. 10, it has been found that the actual joint between first portion 80 and second portion 90 is far less visible than portrayed in FIG. 10, and may often be made substantially invisible by a minor finishing operation such as sanding or flash removal.

Figure 7:
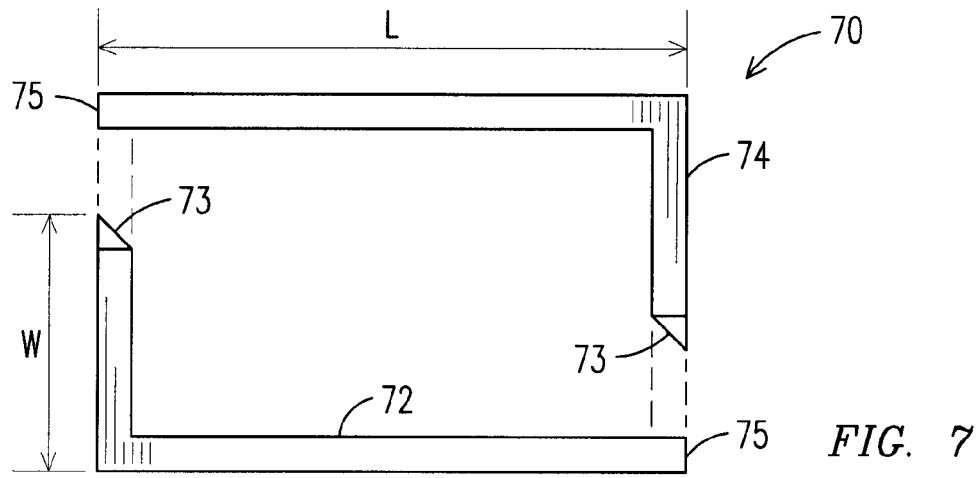
FIG. 7 illustrates lineal members made with segmented molds according to the disclosure to produce window frames of virtually any size.

In yet another embodiment, illustrated in FIG. 7, L-shaped segmented members 72 and 74 are fitted together to form a rectangular fenestration frame 70. Members 72 and 74 are produced using a segmented mold in a RIM molding process as described having end part positions adjustable to define dimensions L and W. In this embodiment, end joints 73 and 75, which may be preformed or formed as part of their respective lineal members, are adapted to allow members 72 and 74 to be produced by the same mold. Thus, the same mold can be used to produce segmented members of virtually any dimensions for use in forming rectangular frames of virtually any desired size, limited only, of course, by the size of the mold. The same is true of other shaped frames as well such as, for instance, segmented members that when joined form hexagonal frames, arched frames, or round frames. In any of these cases, the dimensions of the segments are selectable to form a finished frame of desired size and shape.

Figure 11:
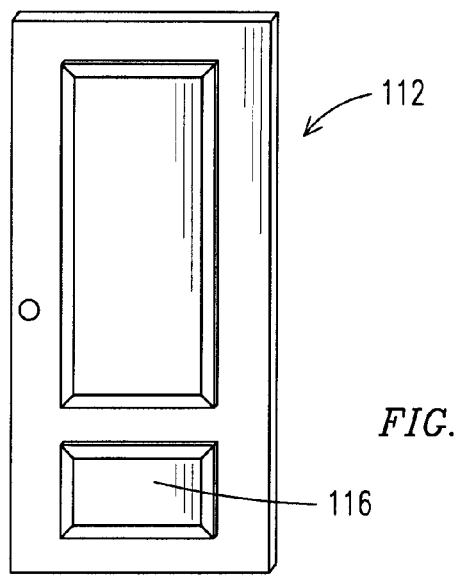
FIG. 11 illustrates a door having a lower panel, or kick plate, having beveled edges.
Figure 12:
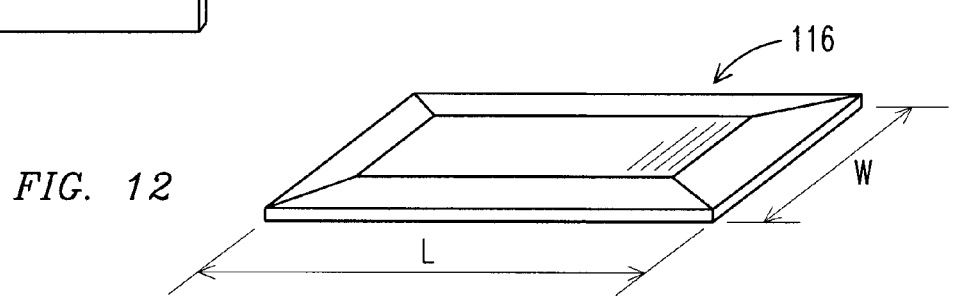
FIG. 12 is a more detailed view of the lower panel shown in FIG. 11.

It is also possible for members to be lineal in more than one direction. Referring to FIGS. 11 and 12, lower panel, or kick plate, 116, in door 110, has a substantially constant cross section in both the horizontal ("h") and vertical ("w") directions. There are therefore two possible mold configurations, one adjustable in the horizontal direction, to vary dimension w to accommodate doors of differing widths, and the alternative mold adjustable in the vertical direction h to accommodate doors of differing heights.

Figure 13:
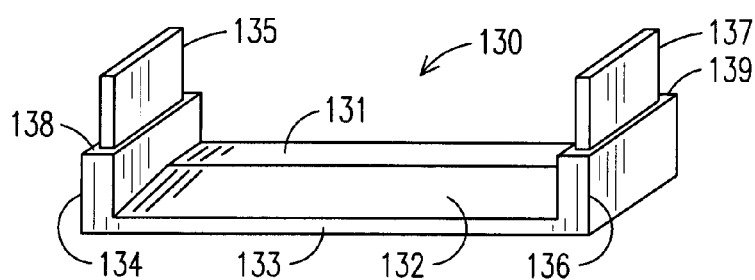
FIG. 13 illustrates a molded threshold produced according to the present invention.

FIG. 13 illustrates threshold member 130 having a lineal bottom span defined by surfaces 131, 132, and 133, and upright end portions 134 and 136. In this embodiment, upright end portions 134 and 136 include tenon portions 135 and 137 for engaging stiles having hollow portions that receive tenon portions 135 and 137. The stiles may, for example, be hollow extrusions or pultrusions having outside profiles dimensioned to form a smooth joint when fitted against surfaces 138 and 139. Upright end portions 134 and 136 serve to locate surfaces 138 and 139 at an elevated level so as to reduce the exposure to water that might leak into the stiles and then into the house, or cause deterioration of the joints between the stiles and tenons 135 and 137. The stiles may be held in place with mechanical fasteners such as screws, or may be adhesively attached to threshold member 130. Surfaces 131, 132, and 133 may be covered by an abrasion resistant material, such as aluminum, and may further include features for receiving weather-stripping or other useful components.

One method of molding threshold member 130 is first to mold a complete threshold member for the smallest anticipated door width. For wider doors, the molded threshold is cut at an intermediate location between upright end portions 134 and 136. The cut pieces are then placed in a lineal mold at a distance that provides the desired threshold length. The resulting mold cavity is then filled with RIM material and the RIM material is allowed to cure, after which the completed threshold is removed from the mold.

Figure 14:
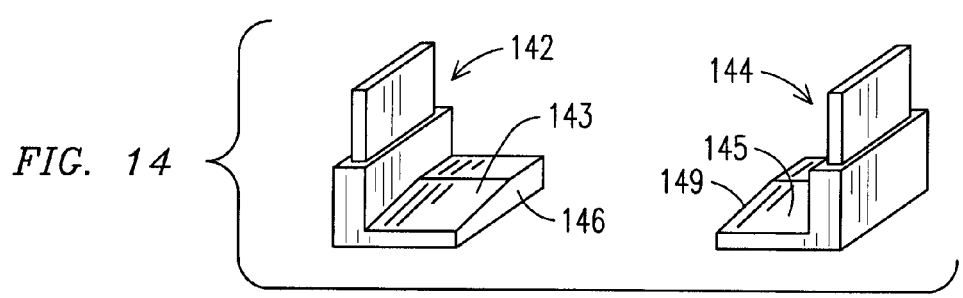
FIG. 14 illustrates end pieces used in an alternative method of producing a threshold according to the present invention.

Alternatively, referring to FIG. 14, the end pieces 142 and 144 can be molded separately. Horizontal portions 143 and 145 are then placed in a lineal mold with surfaces 146 and 149 (not visible) defining the ends of the mold cavity. The cavity is filled with RIM material, which forms an almost seamless bond with surfaces 146 and 149. The RIM material is allowed to cure, the mold is opened, and the finished threshold is removed.

In alternative embodiments, the intermediate portion onto which end pieces 142 and 144 are molded need not be lineal, but could contain non-lineal portions.

Figure 19:
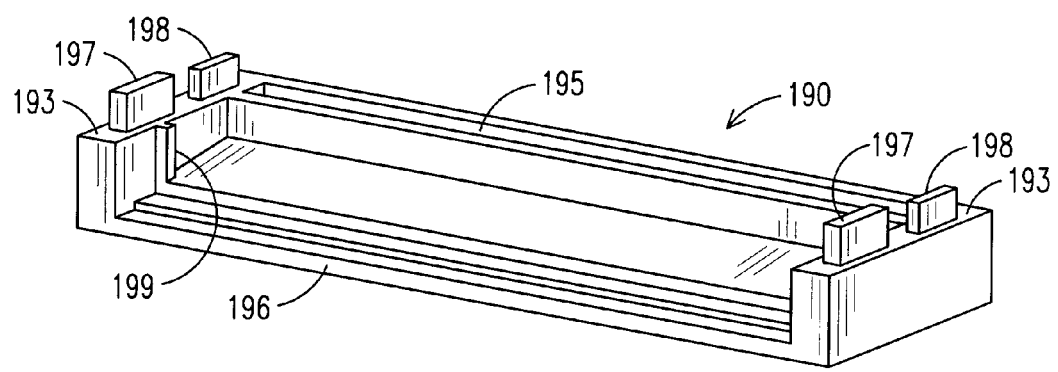
FIG. 19 illustrates a sill for a double hung window that is produced by the RIM process.

Referring to FIG. 19, a window sill with a reduced number of joints is portrayed. Adjustable mold RIM is particularly well suited to producing window sills of this type. Window sill 190 is molded as a single part, thereby moving the joint between the sill and the stiles to interface 193, which can be placed at any desired height, thereby eliminating leakage at low points where water is likely to accumulate and leak into the building structure. Additionally, the sill may include leaked water collection features such as trough 195. While not shown in FIG. 19, trough 195 may be provided with molded-in drainage channels, possibly in the form of inserts, to drain any leaked water to a harmless location, such as the exterior of the building wall.

Other features can also be molded into sill 190. Locating and connecting bosses 197 and 198 can be provided for connection to the vertical members, or stiles, of the window frame. Rib 199 can be provided as an extension of a vertical guide member for guiding a vertically sliding sash. The stiles can be made of any suitable material, but could be made using adjustable mold RIM. An advantage of using RIM would be that mortises for receiving bosses 198 and 199 could be molded into the ends of the stiles. It may be useful to mold metal corner stiffening inserts into the ends of the threshold 190.

Lineally adjustable RIM molds are particularly useful for producing window sills, due to the great number of different widths in which windows must be provided. The adjustable molding techniques described herein are well adapted for producing a range of different sill lengths. For example, a short sill can be molded, cut at its midpoint, the cut ends placed in an adjustable mold, at the desired spacing, the open portion of the mold covered with a second portion of the mold, and the middle portion molded in. The length of the second, or covering, portion of the mold is sufficient to cover the open portion of the mold, but short enough to allow for length adjustment. Alternatively, the end pieces could be moldered separately and placed in an adjustable mold, at the desired spacing, and the middle portion molded in as before.

Lineally adjustable molds are also well suited for producing trim pieces such as cornices, for fitting over the tops of doors and windows. Cornices can be produced directly in a mold of sufficient length, or can be produced in a shorter mold, cut at some intermediate point, and the two resulting parts used as end pieces in a further molding step. Presumably, this sequence of steps could be repeated to produce even longer cornices. Since cornices do not typically support heavy loads, material cost and weight can be reduced by use of hollow or foam inserts, in a manner conventional to RIM.

Figure 18:
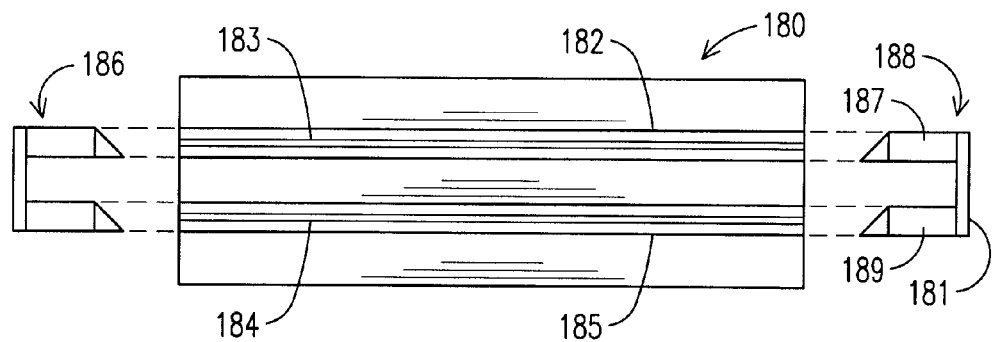
FIG. 18 illustrates a lineally adjustable mold for molding more than one member at a time.

In yet another embodiment, illustrated in FIG. 18, a single mold can be adapted to produce more than one member. This feature is particularly useful when it is desired to produce multiple parts of precisely the same length, as might be needed, for example, in a window frame made up of mating parts that fit together to form a rectangle, a polygon, or other structural configuration. More particularly, since the joints produced by molding in lineally adjustable molds can be made to a high degree of precision, with tighter fits than may be commonly found in, for example, conventionally produced fenestration members, the need for overall precision, not only in the joints but in the length of the parts, is increased. Thus, all of the parts must fit together properly, without the flexibility found in less precise, more loosely fitting joints.

Referring to FIG. 18, lineal profile part 180, shown in shortened form, contains lineal mold cavity portions 182 and 184, which may further contain profile features shown generically as lineal features 183 and 185. Coupled end pieces 186 and 188 can be inserted to distances suitable for producing members of the desired length. By coupling the end pieces, errors leading to differences in length can be reduced. Errors in locating the end 186 and 188 will only produce errors in the overall size of the assembled structure, not in the uniformity of the group of members produced by the mold. It will be understood that while lineal mold profile part 180 only provides for molding two members at a time, such molds are not so limited, and it may be desirable to mold all of the members making up a structure in a single mold, whether that structure is to be made up of two, three, four, or more members.

It will be recognized that the RIM molding process, as disclosed herein, may include additional, known, capabilities of RIM, such as in-mold painting and molding in of inserts. These and other features, aspects, and capabilities are possible and may be implemented by those of skill in the art without departing from the spirit and scope of the invention disclosed herein.

What is claimed is:

1. A mold for producing a plurality of molded lineal members having different predetermined lengths, the mold comprising:
   a first lineal profile mold part having an extended length;
   a second lineal profile mold part having an extended length;
   a first mold end part adapted to form a first end feature of the molded members, and
   second mold end part adapted to form a second end feature of the molded members,
   wherein the first lineal profile mold part and the second lineal mold part couple together along their extended lengths to define an internal mold cavity having a lineal profile, and
   wherein at least one of the first mold end part and the second mold end part can be positioned in at least two different positions between the first lineal mold part and the second lineal mold part to define at least two molded members having the same lineal profile and different predetermined lengths.

2. The mold as recited in claim 1 wherein the first and second lineal mold parts extend in a straight line.

3. The mold as recited in claim 1 wherein the first and second lineal mold parts extend over a curved path.

4. The mold as recited in claim 1 wherein the first and second lineal mold parts each comprise a first segment and a second segment, wherein the first and second segments meet at a nonzero angle.

5. The mold as recited in claim 1 wherein at least one of the first and second mold end parts defines an end feature adapted to enable the molded member to join to another member.

6. The mold as recited in claim 1 wherein at least one of the first and second mold end parts is removable from the molded members.

7. The mold as recited in claim 1 wherein at least one of the first and second mold end parts becomes an integral part of the molded members.

8. The mold as recited in claim 7 wherein at least one of the first and second mold end parts comprises another molded member.

9. The mold as recited in claim 7 wherein at least one of the first and second mold end parts comprises a gasket material.

10. The mold as recited in claim 1 further comprising at least one intermediate mold part positioned within the mold cavity at a position intermediate to the first mold end part and the second mold end part.

11. The mold as recited in claim 1 further comprising a third lineal profile mold part positioned substantially collinear with the first linear mold part and a fourth lineal profile mold part positioned substantially collinear with the second mold part.

12. The mold as recited in claim 1 wherein at least one of the first and second mold end parts is positioned by a power operated holding device.

13. The mold as recited in claim 12 wherein the power operated holding device is controlled by a programmable controller.

14. The mold as recited in claim 13 wherein the programmable controller receives one or more molded product dimensions and determines the position of the at least one first and second mold end part to produce a molded product having the received one or more dimensions.

* * * * *

UNITED STATES PATENT AND TRADEMARK OFFICE
CERTIFICATE OF CORRECTION

PATENT NO. : 8,597,017 B2
APPLICATION NO. : 12/971135
DATED : December 3, 2013
INVENTOR(S) : Troy Rubenzer et al.

Page 1 of 1

It is certified that error appears in the above-identified patent and that said Letters Patent is hereby corrected as shown below:

The following correction is on the title page of the patent under Assignee:

(73) Assignee: Anderson Corporation, Bayport, MN (US)

should read

(73) Assignee: Andersen Corporation, Bayport, MN (US)

Signed and Sealed this
Second Day of December, 2014

Michelle K. Lee
*Deputy Director of the United States Patent and Trademark Office*